United States Patent Office 3,589,993
Patented June 29, 1971

3,589,993
ELECTROPAINTING PROCESS
Donald J. Voskuil, Muskego, John P. Knudtson, Milwaukee, and Myron J. Krupp, Grafton, Wis., assignors to PPG Industries, Inc., Pittsburgh, Pa.
No Drawing. Filed Nov. 14, 1968, Ser. No. 775,954
Int. Cl. B01k 5/02; C23b 13/00
U.S. Cl. 204—181
10 Claims

ABSTRACT OF THE DISCLOSURE

When a mixture of dissimilar pigments are employed in an aqueous composition, for example, an electrodeposition bath, pigment separation is frequently noted. It has now been found that by preparing two aqueous pigment portions such as (A) a pigment, an anion-active agent, and a soluble silicate; and (B) a pigment, a cation-active agent, and a soluble metal salt capable of forming an insoluble silicate and then mixing (A) and (B), thereafter forming a conventional pigment, this problem is reduced or eliminated. The pigments prepared in this manner may be used as pigments in electrodepositable compositions.

---

This invention relates in one aspect to a method of producing a mixed pigment composition which does not separate or cause flooding or floating in organic coating compositions, especially water-based coating compositions and, in another aspect, relates to the use of these pigmentary compositions in the preparation of electrodepositable compositions.

When a coating composition, especially an aqueous coating composition containing a mixed pigment is coated on a substrate there is frequently a tendency promoted by the inherent differences between the dissimilar pigments for pigment separation. This pigment separation is commonly characterized by the terms "flocculation" or "pigment float" or pigment flooding." This problem is especially accentuated in aqueous compositions of low total solids such as those commonly employed in electrodeposition processes.

The problem is most noticeable when the pigments are grossly dissimilar in color, for example, a black such as carbon black and a white such as titanium dioxide are formulated to form a gray. The problem is especially apparent in the "dragout" remaining on unrinsed horizontal surfaces of articles removed from an aqueous bath, especially an electrodeposition bath. An electrodepositable composition comprising a synthetic carboxylic acid resin in this pigment composition separation on the article coated is quite severe and if the dragout is not rinsed off, marked streaking or spotting and areas of white and black color appear on the article. This separation tends to occur with many dissimilar pigments and is especially noticeable where the pigments are of different colors. Obviously, the problem is most noticeable to the eye where the dissimilar pigments are different in color; however, even when pigments are quite similar in color, the separation encountered is deleterious to the formation of high-quality finishes of uniform color, reflectance, and properties.

It has now been found that mixed pigment compositions can be prepared in a manner to avoid or greatly reduce undesirable separation of dissimilar pigments. The method of this invention broadly comprises adding to a portion of a water-wet pigment mixture a water-soluble anionic active material and a soluble silicate, while adding to a second portion of a water-wet pigment mixture a cationic-active material and a water-soluble metal salt capable of precipitating an insoluble silicate formed with the silicate present in the first portion. The pigment is then processed in the normal manner to give a dry pigment in bulk form.

The anion-active material may be virtually any anionic pigment surfactant known in the art. Preferably, the anion-active material is selected from the group consisting of alkali metal salts of organic acids having 10 or more carbon atoms in the molecule, such as alkali metal salts of oleic, linoleic, stearic, palmitic or other fatty acids. Other anion-active materials include alkanolamines, alkyl sulfonates, sulfated and sulfonated amines and amides, diphenyl sulfonate derivatives, isethionates, lignin derivatives, phosphate derivatives, alcohol sulfates, sulfonates of naphthalene and alkyl naphthalenes, sulfated fatty acids, aromatic sulfonates, condensed naphthalene sulfonates, dodecyl and tridecyl benzene sulfonates and free acids, petroleum sulfonates, and taurates. Preferably these anion-active materials, if containing an alkyl chain, should contain at least about an 8 carbon atom chain.

The alkali metal silicate employed may be virtually any water-soluble alkali metal silicate. Preferably the silicate is selected from a group consisting of sodium and potassium silicate.

The cation-active agent which may be utilized in the compositions of this invention may be virtually any water-soluble cationic pigment wetting agent. Among the preferred cationic agents are those selected from the group consisting of amines, salts of amines, water-soluble hydroxy derivatives, quaternary ammonium compounds, sulfonium compounds and phosphonium compounds, said compounds having an open chain aliphatic radical of at least 8 carbon atoms in chain length. The preferred compounds are those in which the long-chain aliphatic radical is an alkyl radical which has an alkyl radical attached directly to the nitrogen, sulfur and phosphorus atoms respectively. In the case of the nitrogen compounds, materials having but one nitrogen atom are to be preferred. Among the water-soluble long-chain amines that may be used are included compounds of either primary, secondary or tertiary character that have been solubilized by conversion of the long chain amine by reaction with solubilizing acids such as sulfuric, hydrochloric, nitric, acetic, formic, sulfamic and the like. As specific representatives of amines which may be solubilized in this manner, such materials as dodecylamine, hexadecylamine, octadecylamine, dodecyl dimethylamine, didodecylamine, octadecyldiethylamine, and the like, may be utilized. As representatives of long-chain amines that have been solubilized by introduction of other water polar groups, such as hydroxyl groups, may be utilized such materials as didodecyl ethanolamine, dodecyl diglycerolamine, dodecyl methyl glucamine, and the like. In certain cases, the water insoluble amine compound itself may be utilized, e.g., in the presence of acid in the pigment slurry where solubilization of the long chain amine will take place in the pigment slurry.

Among the quaternary ammonium compounds that may be utilized in this invention are included those of the trimethylamine pyrridine and betaine types. Representative compounds of this class include octadecyl trimethyl ammonium bromide, hexadecyl trimethyl ammonium bromide, dodecyl pyridinium sulflate, dodecyl pyridinium bromide, dodecyl pyridinium chloride, octadecyl oxymethyl pyridinium chloride, octadecyl choline chloride, octadecyl betaine, and the like. Among the long chain cation-active agents of the sulfonium type are to be included water-soluble salts of organic compounds which are characterized by having at least one ternary sulfonium residue to which is attached at least one alkyl chain containing 8 or more carbon atoms. As specific representatives of this species, including compounds in which the sulfur atom has a positive valence of 4, are to be included methyl benzyl stearyl sulfonium methyl sulfate, lauryl dimethyl sulfonium methyl sulfate, and the like.

A still further species of cation-active agent that may be utilized in this invention includes the phosphorus compounds similar in structure to the nitrogen containing compounds described above. Included in this class are water-soluble salts of organic compounds which are characterized by having at least one phosphonium residue to which is attached at least one aliphatic group containing an aliphatic residue of at least 8 carbon atoms.

The water-soluble salt employed in the compositions of this invention may be any metal salt capable of forming a water-insoluble silicate with the water-soluble silicate described above. This salt may be virtually any water-soluble metal salt other than the alkali metal salts. The salts may be either organic or inorganic in character. Presently preferred are aluminum salts such as the sulfate, nitrate, acetate or chloride. Other salts include alkaline earth metal salts such as calcium, strontium or barium, as well as iron. However, any water-soluble metal salt capable of forming an insoluble silicate may be employed.

The proportions of the anion-active agent and the soluble silicate are not unduly critical. Generally, the anion-active agent is added in an amount from about 0.1 to about 25 percent by weight of the dry pigment and preferably in an amount of about one to about 10 percent by weight. The amount of soluble silica employed is generally between about 0.5 percent and about 10 percent by weight of the dry pigment, and preferably between about one and about 5 percent.

The proportions of the cationic material and water-soluble salt capable of forming a water-insoluble silicate added to the second pigment portion are again not unduly critical. Generally, the cation-active agent is added in an amount from about 0.1 to about 25 percent by weight of the dry pigment and preferably in an amount of about one to about 10 percent by weight. The amount of soluble metal salt employed is generally between about 0.5 percent and about 10 percent by weight of the dry pigment.

Since the soluble silicate and the metal salt combine to form an insoluble compound, it is preferred, although not necessary, that the two components be present in the final mixture in approximately equivalent amounts depending on the insoluble silicate anticipated as being formed.

In the case of both portions, the two agents added to each portion may be added to the water-wet pigment portion in any order. After the addition, the two portions of separately treated pigment are brought together with agitation to form the pigment composition of the invention. At this point the pigment composition is processed in the ordinary manner to give a dry pigment in bulk form.

The presently preferred method comprises adding to a water-wet pigment mixture between 0.1 and 25 percent based on the weight of the pigment before treatment of an alkyl ammonium acetate, for example, tallow-1,3-propylene diamine acetate; and between one percent and 10 percent based on the weight of the pigment composition before treatment of aluminum sulfate. The aluminum salt is added to a half portion of the water-wet major pigment component of the ultimate desired mix, for example, titanium dioxide in a gray mixture. Immediately after, the amine salt is added. Another half portion of the water-wet major pigment component plus the minor pigment, in the case of the gray, carbon black, is prepared, adding between 0.11 percent and 27.6 percent of sodium oleate and between about 2.2 percent and about 22 percent of sodium silicate, again based on the weight of the pigment before treatment. After thorough mixing of the two portions, the two portions are added together under agitation. The pigment is then filtered, washed, dried and milled to a fine powder.

The pigment treating agents, that is, the soluble metal salt and the cation-active material on the one hand and the anion-active material and the silicate on the other hand may be added to each portion of water-wet pigment in any order prior to mixing. For example, the cation-active material and the metal salt may be added to each portion simultaneously, if desired. While, as stated, the order of mixing is not critical, it is presently preferred to add the final silicate containing portion to the metal salt containing portion.

The method of preparing the pigment compositions of this invention are further described in conjunction with the following examples, which are to be considered illustrative rather than limiting. All parts and percentages in the examples and throughout this specification are by weight unless otherwise stated.

EXAMPLE I

A dispersion of 2000 parts of titanium dioxide was made in a solution of 1700 parts of water and 64 parts of aluminum sulfate, using a high-speed mixer for dispersion. There was then added 15,800 parts of water containing 19 parts of tallow-1,3-propylene diamine acetate while under agitation.

Another dispersion of 2000 parts of titanium dioxide and 100 parts of carbon black was made in a solution of 1100 parts of water, 62 parts of butyl Cellosolve (employed as a foam reducer) and 320 parts of a 38 percent sodium silicate solution, as well as 21 parts of sodium oleate. Approximately 160 parts of water was added to this second dispersion just prior to adding to it the first dispersion, the latter being under agitation at a temperature of 40° C. The combined slurry was pumped, the two pigment compositions being thoroughly mixed under agitation, and pumped to filter presses, washed, dried and hammer-milled.

EXAMPLE II

A dispersion of 2000 parts of titanium dioxide was made in a solution of 1700 parts of water, 18 parts of dodecyl trimethyl ammonium chloride and 64 parts of aluminum sulfate. This was then diluted with 16,000 parts of water.

Another dispersion of 2000 parts of titanium dioxide and 100 parts of carbon black was made in a solution of 1100 parts of water, 22 parts of mineral spirits, 320 parts of a 38 percent solution of sodium silicate and 21 parts of sodium stearate. After complete dispersion, approximately 160 parts of water was added to the second dispersion prior to adding the second dispersion to the first while under agitation at a temperature of 50° C. The combined slurry was pumped to filter presses, washed, dried and hammer-milled.

EXAMPLE III

A dispersion of 2000 parts of chrome yellow, lemon shade, was made in a solution of 1400 parts of water, 9.6 parts of N-octylamine and 47 parts of aluminum chloride. This was then diluted with 1600 parts of water.

A second dispersion of 2000 parts of chrome yellow and 200 parts of iron blue was made in a solution of 1100 parts of water, 25 parts of mineral spirits, 320 parts of a 38 percent solution of sodium silicate and 21 parts of sodium oleate. After complete dispersion of the pigments, there was added approximately 160 parts of water to the second dispersion prior to its addition to the first dispersion, which was under agitation at a temperature of 40° C. The combined slurry was pumped for filtering, washed, dried and hammer-milled.

The foregoing represent the preparation of pigments in several preferred embodiments, but is of course understood that numerous variations and modifications can be made within the scope of the invention as described, for example, other pigments, cation- and anion-active materials as well as silicates and metal salts can be substituted for those of the examples to provide results within the scope of the invention.

As previously stated, the pigments of this invention find particular use in electrodeposition.

Virtually any conductive substrate may be coated by electrodeposition. The most commonly employed substrates include the base metals such as iron, steel, aluminum, copper, zinc, brass, tin, nickel and chromium, as well as other metals and pretreated metals. Impregnated paper, or other substrates rendered conductive under the conditions employed, may also be coated.

Electrodeposition of certain materials, including waxes, natural and synthetic resins, have been known in the art for some time. Likewise, a recent U.S. Pat. No. 3,230,162, describes a method and compositions presently utilized in the field of automotive finishing and industrial coatings.

A number of electrodepositable resins are known and can be employed to provide the electrodepositable composition of this invention. Virtually any water-soluble, water-dispersible, or water-emulsifiable polycarboxylic, resinous material can be electrodeposited and, if film-forming, provides a coating which may be suitable for certain purposes. Any such electrodepositable is included among those which can be employed in the present invention, even though the coating obtained may not be entirely satisfactory for certain specialized uses.

The resins which may be employed in the present invention include resins comprising a reaction product or adduct of a drying oil or semi-drying oil fatty acid ester with a dicarboxylic acid or anhydride. By "drying oil or semi-drying oil fatty acid esters" are meant esters of fatty acids which are or can be derived from such sources as tall oil. Such fatty acids are characterized by containing at least a portion of polyunsaturated fatty acids. Preferably, the drying oil or semi-drying oil per se is employed. Generally, drying oils are those oils which have an iodine value of above about 130, and the semi-drying oils are those which have an iodine value of about 90 to 130, as determined by method ASTM–D1467–57T. Examples of such esters include linseed oil, soya oil, safflower oil, perilla oil, tung oil, oiticica oil, poppyseed oil, sunflower oil, tall oil esters, walnut oil, dehydrated caster oil, herring oil, manhadan oil, sardine oil, and the like.

Also included among such esters are those in which the esters themselves are modified with other acids, including saturated, unsaturated or aromatic acids, such as butyric acid, stearic acid, linoleic acid, phthalic acid, isopthhalic acid, terephthalic acid or benzoic acid, or an anhydride of such an acid. One inexpensive acid material which has been found to produce good results in many instances is rosin, which is composed of chiefly abiotic acid and other resin acids. The acid-modified esters are made by transesterification of the ester, as by forming a di- or monoglyceride by alcoholysis, followed by esterification with the acid. They may also be obtained by reacting oil acids with a polyol and reacting the acid with the partial ester. In addition to glycerol, alcoholysis can be carried out using other polyols such as trimethylolpropane, pentaerythritol, sorbitol, and the like. If desired, the esters can also be modified with monomers such as cyclopentadiene or styrene and the modified esters produced thereby can be utilized herein. Similarly, other esters of unsaturated fatty acids, for example, those prepared by the esterification of tall oil fatty acids with polyols are also useful.

Also included within the terms "drying oil fatty acid esters and semi-drying oil fatty acid esters," as set forth herein, are alkyd resins prepared utilizing semi-drying or drying oils; esters of epoxides with such fatty acids, including esters of diglycidyl ethers of polyhydric compounds, as well as other mono-, di-, and polyepoxides, semi-drying oil or drying oil fatty acid esters of polyols, such as butanediol, trimethylolethane, trimethylolpropane, trimethylolhexane, pentaerythritol, and the like; and semi-drying or drying fatty acid esters of resinous polyols such as homopolymers or copolymers of unsaturated aliphatic alcohols, e.g., allyl alcohols or metallyl alcohol, including copolymers of such alcohols with styrene or other ethyenically unsaturated monomers with non-oil modified alkyd resins containing free hydroxyl groups.

Any alpha, beta-ethylenically unsaturated dicarboxylic acid or anhydride can be employed to produce the reaction products described herein. These include such anhydrides as maleic anhydride, itaconic anhydride, and other similar anhydrides. Instead of the anhydride, there may also be used ethylenically unsaturated dicarboxylic acids which form anhydrides, for example, maleic acid or itaconic acid. These acids appear to function by first forming the anhydride. Fumaric acid, which does not form an anhydride, may also be utilized, although, in many instances, it requires more stringent conditions than the unsaturated dicarboxylic acid anhydrides or acids which form such anhydrides. Mixtures of any of the above acids or anhydrides may also be utilized. Generally speaking, the anhydride or acid employed contains from 4 to 12 carbon atoms, although longer chain compounds can be used if so desired.

While the reaction products can be comprised solely of adducts of the fatty acid ester and the dicarboxylic acid or anhydride, in many instances it is desirable to incorporate into the reaction product another ethylenically unsaturated monomer. For this purpose, any ethylenically unsaturated monomer can be employed. Examples of such monomers include monoolefinic and diolefinic hydrocarbons such as styrene, alpha-butyl styrene, vinyl toluene, butadiene-1,3-isoprene, and the like; halogenated monoolefinic and diolefinic hydrocarbons, such as alpha-chlorostyrene, alphabromostyrene, chlorobutadiene and similar compounds; esters of organic and inorganic acids, such as vinyl acetate, vinyl propionate, vinyl-2-chlorobenzoate, methyl acrylate, ethyl methacrylate, butyl methacrylate, heptyl acrylate, decyl methacrylate, methyl crotonate, isopropenyl acetate, vinyl alpha-bromo propionate, vinyl alpha-chlorovalerate, allyl chloride, allyl cyanide, allyl bromide, allyl acetate, dimethyl itaconate, dibutyl itaconate, ethyl alpha-chloroacrylate, isopropyl alpha-bromoacrylate, decyl alpha-chloroacrylate, dimethyl maleate, diethyl maleate, dimethyl fumarate, diethyl fumarate, and diethyl glutaconate; organic nitriles, such as acrylonitrile, methacrylonitrile and ethacrylonitrile, and the like.

As is apparent from the above discussion and the examples set forth, which, of course, do not include all of the ethylenically unsaturated monomers which may be employed, any such monomer can be utilized. The preferred class of monomers can be described by the formula:

(I)
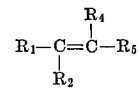

where $R_1$ and $R_2$ are hydrogen or alkyl, $R_4$ is hydrogen, alkyl or carboalkyl, and $R_5$ is cyano, aryl, alkyl, alkenyl, aralkyl, alkaryl, alkoxycarbonyl or aryloxycarbonyl. The preferred compounds are styrene, substituted styrenes, alkyl acrylates, alkyl methacrylates, diolefins and acrylonitrile.

Th products produced in the above manner are comprised of polymeric chains of moderate length. The average molecular weight of the products to be used in electro-deposition should be low enough so that its flow characteristics at high solids are maintained, but high enough to provide adequate throwing power. The desirable molecular weight levels vary with the coating composition and conditions employed. Generally, those products having molecular weights of up to 10,000 or somewhat higher have given the best results.

Neutralization of these products is accomplished by reaction of all or part of the dicarboxylic anhydride groups with a base. Usually up to about half of such groups are neutralized in unesterified adducts. The partially esterified products are often neutralized to a greater extent, based on unesterified acid groups remaining.

It is preferred in certain instances that the neutralization reaction be carried out in such a manner that amido groups are attached to part of the carbonyl carbon atoms derived from the dicarboxylic acid or anhydride. By amido groups are meant trivalent nitrogen atoms attached with one valence to the carbonyl carbon atom with the other two valences being linked to hydrogen or carbon atoms in the same or different organic radicals. Amido groups are formed, for example, when the reaction with the neutralizing base is carried out with a water solution of ammonia, a primary amine or a secondary amine, or when the product is reacted with such an amine in the absence of water.

Compositions within this general class are described in copending applications, Ser. No. 222,674, filed Sept. 10, 1962, now U.S. Pat. No. 3,366,563, and Ser. No. 282,880, filed May 24, 1963, now U.S. Pat. No. 3,369,983.

Another type of electrodepositable coating composition which gives desirable results are the water-dispersible coating compositions comprising at least partially neutralized interpolymers of hydroxyalkyl esters of unsaturated carboxylic acids, unsaturated carboxylic acids and at least one other ethylenically unsaturated monomer. These are employed in the composition along with an amine-aldehyde condensation product or a polyepoxide, or both, with the interpolymer usually making from about 50 percent to about 95 percent by weight of the resinous composition.

The acid monomer of the interpolymer is usually acrylic acid or methacrylic acid, but other ethylenically unsaturated monocarboxylic and dicarboxylic acids, such as ethacrylic acid, crotonic acid, maleic acid, or other acids of up to about 6 carbon atoms can also be employed. The hydroxyalkyl ester is usually hydroxyethyl or hydroxypropyl acrylate or methacrlate, but also desirable are the various hydroxyalkyl esters of the above acids having; for example, up to about 5 carbon atoms in the hydroxyalkyl radical. Mono- or diesters of the dicarboxylic acids mentioned are included. Ordinarily, the acid and ester each comprise between about one percent and about 20 percent by weight of the interpolymer, with the remainder being made up of one or more other copolymerizable ethylenically unsaturated monomers. The most often used are the alkyl acrylates, such as ethyl acrylate; the alkyl methacrylates, such as methyl methacrylate; and the vinyl aromatic hydrocarbons, such as styrene; but others can be utilized.

The above interpolymer is at least partially neutralized by reaction with a base as described above. At least about 10 percent and preferably 50 percent or more of the acidic groups are neutralized, and this can be carried out either before or after the incorporation of the interpolymer in the coating composition. The bases above can be used, with ammonia and amines being preferred.

The amine-aldehyde condensation products included in these compositions are, for example, condensation products of melamine, benzoguanamine, or urea with formaldehyde, although other amine-containing amines and amides, including triazines, diazines, triazoles, guanidines, guanamines, and alkyl- and aryl-substituted derivatives of such compounds can be employed, as can other aldehydes, such as acetaldehyde. The alkylol groups of the products can be etherified by reaction with an alcohol, and the products utilized can be water-souble or organic solvent-soluble.

Electrodeposition compositions comprising the above interpolymers and an amine-aldehyde resin are more fully described in copending application Ser. No. 368,394, filed May 18, 1964, now U.S. Pat. No. 3,403,088.

Still another electrodepositable composition of desirable properties comprises an alkyd-amine vehicle, that is, a vehicle containing an alkyd resin and an amine-aldehyde resin. A number of these are known in the art and may be employed. Preferred are water-dispersible alkyds, such as those in which a conventional alkyd (such as a glyceryl phthalate resin), which may be modified with drying oil fatty acids, is made with a high acid number (e.g., to 70) and solubilized with ammonia or an amine, or those in which a surface active agent, such as a polyalkylene glycol (e.g., "Carbowax"), is incorporated. High acid number alkyds are also made by employing a tricarboxyl acid, such as trimellatic acid or anhydride, along with a polyol in making the alkyd.

The above alkyds are combined with an amine-aldehyde resin, such as those described hereinabove. Preferred are water-soluble condensation products of melamine or a similar triazine with formaldehyde with subsequent reaction with an alkanol. An example of such a product is hexakis (methoxymethyl) melamine.

The alkyd-amine compositions are dispersed in water and they ordinarily contain from about 10 percent to about 50 percent by weight of amine resin, based on the total resinous components.

Examples of the compositions of this class are described in U.S. Pat. Nos. 2,852,475; 2,852,476 and 2,853,459.

Yet another electrodepositable composition of desirable prosperties comprises mixed esters of a resinous polyol. These resin esters comprise mixed esters of an unsaturated fatty acid adduct. Generally the polyols which are utilized with these resins are essentially any polyol having a molecular weight between about 500 and 5000. Such resinous polyols include those resinous materials containing oxirane rings which can be opened in, prior to, or during the esterification recation to provide an apparent hydroxy site. The vehicle resins are formed by reacting a portion of the hydroxyl groups of the polyol with the fatty acid, the ratio of the reactions being such that at least an average of one hydroxyl group per molecule of the polyol remains unreacted. The remaining functionality is then reacted with the unsaturated fatty acid adduct of an olefinically unsaturated dicarboxylic anhydride, such as maleic anhydride, this second esterification reaction being conducted under conditions so that esterification occurs through the anhydride ring, thereby introducing free acid groups into the molecule. Mixed acids of the class described are disclosed in Belgian Pat. No. 641,642, as well as in copending application Ser. No. 568,144, filed July 27, 1966, and now abandoned.

In order to produce an electrodepositable composition, it is necessary to at least partially neutralize the acid groups persent with a base in order to disperse the resin in the electrodeposition bath. Inorganic bases such as metal hydroxides can be used, but it is preferred to use ammonia or organic bases, especially water-soluble amines, such as, for example, the mono- di- and tri-lower alkyl amines such as methylamine, ethylamine, propylamine, butylamine, dimethylamine, diethylamine, dipropylamine, dibutylamine and m-methyl-butylamine, triethylamine, tributylamine, methyldiethylamine, dimethylbutylamine, and the like; cyclic amines such as morpholoine, pyrrolidine, piperidine; diamines such as hydrazine, methylhydrazine, 2,3-toluene diamine, ethyl diamine and piperizine and substituted amines such as hydroxylamine, ethanolamine, diethanolamine, butanolamine, hexanolamine, and methyldiethanolamine, octanolamine, diglycolamine and other polyglycol amines, triethanolamine, and methylethanolamine, n-amine-ethanolamine and methyldiethanolamine and polyamines such as diethylene trimamine, triethylene tetramine, hexamethylene tetramine.

The pigments of the invention are introduced into the compositions of the invention in the same manner as conventionaly pigments are dispersed. Preferably, the pigment is reduced to a small particle size, usually less than about 200 mesh and, prferably, less than about 25 microns and, more preferably, below 10 microns before being added to the vehicle. If large particles of coal are introduced, the grinding will require more time and perhaps a filtration step to remove oversized particles remaining.

The pigment is dispersed by grinding in the presence of at least a portion of the vehicle resin and, in most cases, a surfactant or dispersing agent, or in surfactant or dispersing agent with later addition of a vehicle resin. Grinding is accomplished by the use of ball mills, sand mills, Cowles dissolvers, continuous attritors, and the like, until the pigment has been reduced to the desired size and preferably, has been wet by and dispersed in the vehicle resin and/or dispersing agent.

Preferably, the grinding is conducted in an aqueous dispersion of neutralized resin having a pH above about 7 and preferably about 9.0. The amount of water present in such an aqueous grind is not critical; however, commonly the resin employed in the grinding step is about 30 to 70 percent solids. The use of more water merely reduces the effective capacity of the mill and, while less water can be employed, the viscosity creates some problems in certain instances.

The pigment-binder ratio in the grinding step is not critical; however, levels between about 3.5:1 to 7:1 are frequently employed, although other levels may be utilized.

After grinding the particle size should be in the range of 10 microns or less, preferably as small as practicable. Generally, a Hegman grind gauge reading of about 6 is the minimum for a presently commercially-acceptable composition.

For a general review of pigment grinding and paint formulation, reference may be had to: D. H. Parker, Principles of Surface Coating Technology, Interscience Publishers, New York (1965); R. L. Yates, Electrocoating, Robert Draper Ltd., Teddington, England (1966); and H. F. Payne, Organic Coating Technology, vol. II, Wiley & Sons, New York (1961).

The pigment of the invention may be a combination of any of the types of pigments employed in the art, for example, iron oxide, lead silico chromate, strontium chromate, carbon black, graphite, manganese dioxide, titanium dioxide, talc, barium sulfate, and the like, as well as combinations of these and similar pigments. Color pigments such as cadmium yellow, cadmium red, hydrated iron oxide, and the like, may be included if desired.

It has been found especially important to regulate the ratio of pigment to the vehicle in compositions which are used in electrodeposition processes. In most instances the most desirable coatings are obtained when the coating composition contains a ratio of pigment-to-vehicle preferably not higher than 2 to 1. If the composition has too high a pigment-to-vehicle ratio, the electrodeposited films may exhibit very poor flow characteristics and, in many instances, are non-continuous and have poor film appearance.

In many instances, it is preferred to add to the bath in order to aid dispersibility, viscosity and/or film quality, a non-ionic modifier or solvent. Examples of such materials are aliphatic, naphthenic and aromatic hydrocarbons or mixtures of the same; mono- and dialkyl ethers of glycols, pine oil and other solvents compatible with the resin system. The presently preferred modifier is 4-methoxy-4-methyl-pentanone-2 (Pent-Oxone).

There may also be included in the coating composition, if desired, additives such as antioxidants. For example, orthoamylphenol or cresol. It is especially advantageous to include such antioxidants in coating compositions which are used in baths which may be exposed to atmospheric oxygen at elevated temperatures and with agitation over extended periods of time.

Other additives which may be included in coating compositions, if desired, include, for example, wetting agents such as petroleum sulfonates, sulfated fatty amines, or their amides, esters of sodium isothionates, alkyl phenoxy polyoxyethylene alkanols, or phosphate esters including ethoxylated alkylphenol phosphates. Other additives which may be employed include anti-foaming agents, suspending agents, bactericides, and the like.

In formulating the coating composition, ordinary tap water may be employed. However, such water may contain a relatively high level of metals and cations which, while not rendering the process inoperable, may result in variations of properties of the baths when used in electrodeposition. Thus, in common practice, deionized water, i.e., water from which free ions have been removed by the passage through ion exchange resins, is invariable used to make up coating compositions of the instant invention.

In addition to the electrodepositable vehicle resins described above, there may be present in the electrodepositable composition other resinous materials which are non-carboxylic acid materials. For example, there may be added up to about 50 percent by weight of an amine aldehyde condensation product. Examples of such amine aldehyde condensation products employed are aldehyde condensation products of melamine, urea, acetoguanamine or a similar compound, and may be water-soluble or organic solvent-soluble. Generally, the aldehyde employed is formaldehyde, although useful products can be made from other aldehydes such as acetaldehyde, crotonaldehyde, acrolein, benzaldehyde, furfural and others. Condensation products of melamine or urea are the most common and are preferred, but products of other amines and amides in which at least one amido group is present can be employed.

For example, such condensation products can be produced with triazines, diazines, triazoles, guanidines, guanamines, and alkyl- and aryl-substituted derivatives of such compounds, including alkyl-substituted and aryl-substituted cyclic ureas, and alkyl- and aryl-substituted melamines Examples of such compounds are:

N,N'-dimethyl urea
Benzyl urea
N,N'-ethylene urea
Diazine diamide
Formaguanamine
Benzoguanamine
Ammeline
2-chloro-4,6-diamino-1,3,5-triazine
3,5-diaminotriazole
4,6-diaminopyrrimidine
2,4,6-triphenyltriamino-1,3,5-triazine and the like.

These aldehyde condensation products contain methylol groups or similar alkylol groups, depending upon the particular aldehyde employed. If desired, these methylol groups can be etherified by reaction with an alcohol. Various alcohols are employed for this purpose, including essentially any monohydric alcohol, although the preferred alcohols are methanol, butanol, and similar lower alkanols.

The amine-aldehyde condensation products are produced in a manner well-known in the art, using aeedic or basic catalysts and varying conditions of time and temperature. The aldehyde is often employed as a solution in water or alcohol, and the condensation, polymerization and etherification reactions may be carried out either sequentially or simultaneously.

In the electrodeposition process, a process well-described in the art, the aqueous bath containing the composition is placed in contact with an electrically-conductive anode, and an electrically-conductive cathode. The coating is deposited upon the anode so that the metal substrate to be coated is used as the anode. Upon passage of electric current (normally direct current) between the anode and the cathode while in contact with the bath containing the coating composition, an inherent film of the coating composition is deposited on the anode.

The conditions at which the electrodeposition process is carried out are those conventionally used in electrodeposition. The applied voltage may vary greatly and can be as low as, for example, one volt or as high, for example, as 500 volts or higher. It is typically between 50 and 350 volts. The current tends to decrease during electro-deposition and the films become electrically insulative and cause the deposition of film to be self-terminating at any particular voltage.

The anode employed may be any electrically conductive metal, such as iron, steel, aluminum, galvanized steel, phosphatized steel, zinc, and the like.

The concentrations of the coating composition in the aqueous bath used in electrodeposition is not critical and relatively high levels of coating composition can be used; however, it is ordinarily desirable to use a low concentration of coating composition since this is one of the benefits inherent in the system. Baths containing as little as one percent by weight of the coating composition in water can be employed. In general practice, the baths used usually contain between 5 and about 15 percent by weight of pain solids. Generally, it is preferred not to use more than 20 or 25 percent by weight of the coating composition in the bath, although there is no technical reason why films cannot be produced in even higher levels. Once the film is deposited upon the substrate and the substrate removed from the bath, the article is treated as one which has been coated in the conventional painting operation. The article may be air-dried, or, usually it is heated in an oven or by some other appropriate means to bake or dry the film. When this is done, the baking temperatures of about 275° F. to about 375° F. for 60 to 10 minutes are usually employed.

The invention is further described in conjunction with the following examples which are to be considered illustrative rather than limiting.

EXAMPLE IV

An electrodepositable composition was prepared as follows:

Into a grinding mill containing ceramic media were charged a mixture of:

| | Parts by Wt. |
|---|---|
| Mixed partial ester vehicle resin | 1283 |
| | Percent |
| Tall oil fatty acids | 31.6 |
| Epon 1004 | 45.1 |
| Maleinized tall oil fatty acids | 23.3 |
| (80% solid in ethylene glycol monoethyl ether, viscosity 33,000 centipoises, acid value 45.12) | |
| Dimethylethanolamine | 97 |
| Deionized water | 2440 |

To which was added:

| | |
|---|---|
| Strontium chromate | 290 |
| Aluminum silicate | 1625 |
| Titanium dioxide | 2445 |
| Carbon black | 200 |
| Lead silicate | 49 |

This total mixture was then ground to a 6½ Hegman. The resulting paste was let down with 265 parts of the following:

| | Parts by wt. |
|---|---|
| Mixed partial ester vehicle resin (as described above) | 2750 |
| Hexakis (methoxy methyl)melamine | 267 |
| Dimethylethanolamine | 176 |
| Deionized water | 2094 |
| Cresylic acid | 13 |

The resulting composition was reduced to 10 percent solids at a pH of 8.5 with deionized water and electrodeposited on cold rolled steel at 250 v. for 90 seconds at a bath temperature of 80° F.

When the article with a horizontal surface was removed from the bath without rinsing or draining the dragout from the surface, allowed to stand 10 minutes and then baked at 350° F. for 20 minutes, both black and yellow pigment float was obviously noticable on the horizontal surface.

In contrast, a similar composition, utilizing a pigment prepared according to the instant invention as follows:

Into a grinding mill containing ceramic media were charged a mixture of:

| | Parts by wt. |
|---|---|
| Mixed partial ester vehicle resin (as described above) | 625 |
| Dimethylethanolamine | 45 |
| Deionized water | 1330 |

To this mixture was added:

| | Parts by wt. |
|---|---|
| Monogrey pigment (as in Example I) | 1200 |
| Aluminum silicate | 600 |
| Lead silicate | 20 |
| Strontium chromate | 18 |

This total mixture was then ground to a 6½ Hegman. The resulting paste was let down as follows:

| | |
|---|---|
| Paste (above) | 1440 |
| Mixed partial ester vehicle resin (as described above) | 3010 |
| Dimethylethanolamine | 195 |
| Deionized water | 2353 |
| Hexakis(methoxymethyl)melamine | 288 |
| Cresylic acid | 14 |

The resulting mixture was reduced to 10 percent solids with deionized water and coated, dried and baked in the same manner as the preceding coating. No float was apparent on any surface, including the horizontal surfaces.

The foregoing illustrates the use of the pigments of the invention in an electrodeposition process, but it is, of course, understood that numerous variations and modifications can be made within the scope of the invention described. For example, the vehicle resin may be replaced by any resin operable in an electrodeposition process. Similarly, pigments within the scope of the invention, including those specifically shown, may be substituted for the pigment employed above with equivalent results.

According to the provisions of the patent statutes, there are described above the invention and what are now considered to be its best embodiments. However, within the scope of the appended claims, it is to be understood that the invention can be practiced otherwise than as specifically described.

What is claimed is:

1. In a method of electrocoating an anode with a paint in an electrical circuit comprising a bath of aqueous medium in electrical contact with an anode and a cathode, the improvement comprising dispersing in said bath a paint comprising a base-solubilized synthetic polycarboxylic acid resin vehicle having dispersed therein, in pigmentary form, a mixed pigment composition containing at least two distinct pigments prepared by the steps comprising:

(A) admixing the first pigment portion with an anion-active surfactant and a water-soluble silicate;

(B) admixing a second pigment portion with a cation-active surfactant and water-soluble metal salt capable of forming a water-insoluble silicate with the silicate of (A); and (C) admixing portions (A) and (B), thereby forming a pigment mixture having reduced pigment separation.

2. A method as in claim 1 wherein at least one portion of (A) and (B) contains at least two distinct pigments.

3. A method as in claim 1 wherein portion (A) is added to portion (B).

4. A method as in claim 1 wherein the water-soluble metal salt and the water-soluble silicate are present in approximately chemically equivalent amounts.

5. A method as in claim 1 wherein in portion (A) the anion-active surfactant is present in an amount between about 0.1 and about 25 percent by weight of the dry pigment and the water-soluble silicate is present in an amount between about 0.5 and about 10 percent by weight of the dry pigment; and wherein in portion (B) the cation-active surfactant is present in an amount between about 0.1 and about 25 percent by weight of the dry pigment and the water-soluble metal salt is present in an amount between about 0.5 and about 10 percent by weight of the dry pigment.

6. A method as in claim 1 wherein in portion (A) the anion-active surfactant is present in an amount between about 1 and about 10 percent by weight of the dry pigment and the water-soluble silicate is present in an amount between about 1 and about 5 percent by weight of the dry pigment; and wherein in portion (B) the cation-active surfactant is present in an amount between about 1 and about 10 percent by weight of the dry pigment and the water-soluble metal salt is present in an amount between about 1 and about 5 percent by weight of the dry pigment.

7. A method as in claim 1 wherein the anion-active surfactant is an alkali metal salt of an organic acid containing at least 10 carbon atoms and the cation-active surfactant is selected from the group consisting of water-soluble amines, salts of amines, hydroxyamine derivatives, quaternary ammonium compounds, sulfonium compounds, and phosphonium compounds, each member of the group having an open chain aliphatic group of at least 8 carbon atoms.

8. A method as in claim 1 wherein the silicate is an alkali metal silicate and the metal salt is a water-soluble aluminum salt.

9. A method as in claim 1 wherein the pigments comprise a mixture of white and black pigments.

10. A method as in claim 1 wherein the pigment comprises a major amount of titanium dioxide.

References Cited
UNITED STATES PATENTS

| | | | |
|---|---|---|---|
| 3,230,162 | 1/1966 | Gilchrist | 204—181 |
| 3,366,563 | 1/1968 | Hart et al. | 204—181 |
| 3,428,589 | 2/1969 | Coats | 204—181X |
| 3,448,027 | 6/1969 | Hart et al. | 204—181 |

DANIEL E. WYMAN, Primary Examiner

W. J. SHINE, Assistant Examiner